United States Patent Office 3,471,487
Patented Oct. 7, 1969

3,471,487
3-[(HALOPHENOXY)METHYL]-as-TRIAZINE
Donald L. Trepanier, Indianapolis, Ind., assignor to The
Dow Chemical Company, Midland, Mich., a corporation of Delaware
No Drawing. Filed Oct. 23, 1967, Ser. No. 677,037
Int. Cl. C07d 55/10; A61k 27/00
U.S. Cl. 260—248                             7 Claims

ABSTRACT OF THE DISCLOSURE

New 3-[(halophenoxy)methyl]-as-triazine compounds such as 3-[(4-amino-3-chlorophenoxy)methyl]-1,4,5,6-tetrahydro-as-triazine, and their pharmaceutically-acceptable salts such as the mono- and dihydrochloride and a method for their preparation are disclosed. The compounds have antidepressant activity.

SUMMARY OF THE INVENTION

This invention is concerned with haloaryloxy-as-triazines and is particularly directed to 3-[(halophenoxy)methyl]-1,4,5,6-tetrahydro-as-triazines and the pharmaceutically-acceptable salts thereof corresponding to the formula:

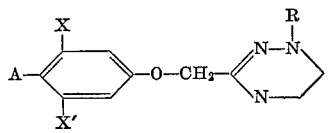

In the present specification and claims, A represents acetamido or amino, R represents methyl or hydrogen, X represents chlorine or bromine and X' represents hydrogen, chlorine or bromine. The term "pharmaceutically-acceptable salt" as herein employed refer to non-toxic salts of the halophenoxymethyl-as-triazines. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid or with organic sulfonic acids such as methanesulfonic or p-toluenesulfonic acid. The novel compounds are crystalline solids which are of varying degrees of solubility in organic solvents such as chloroform, methylene chloride, esters such as ethyl acetate and alcohols and only slightly soluble in water. The pharmaceutically-acceptable salts of the novel compounds such as 3-[(4-amino-3-chlorophenoxy)methyl] - 1,4,5,6-tetrahydro-as-triazine dihydrochloride are soluble in water and slightly soluble in organic solvents such as acetone, benzene and alcohols.

The novel compounds corresponding to the above formula are useful for administration to laboratory animals in studying the behavior thereof and in studying drug effects on the central and peripheral nervous system, and are particularly useful as antidepressants. The compounds wherein X' is hydrogen are the preferred compounds for antidepressant use. For such uses, the preferred form of the halophenoxymethyl-as-triazine compounds wherein A is amino is a pharmaceutically-acceptable salt thereof and the compounds are preferably employed in the form of their dihydrochloride salts. The compounds wherein A is acetamido are also useful as intermediates in the preparation of the compounds wherein A is amino. When employed as intermediates, such compounds are preferably employed in the free base form. Other salts can also be used in the preparation and purification of the halophenoxymethyl-as-triazines and can be converted to the dihydrochloride salts or to the free base.

The compounds of the invention wherein A is acetamido can be prepared by the reaction of an imino ester hydrohalide corresponding to Formula II with a 2-aminoalkylhydrazine corresponding to Formula III:

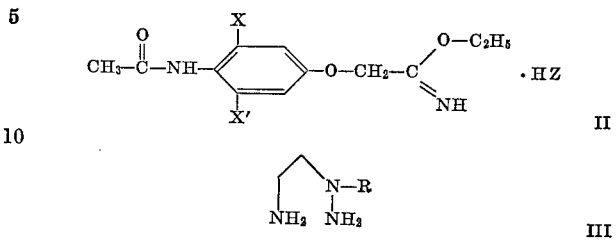

In Formulae II and III above, R, X and X' have the significance set out above with respect to Formula I and HZ represents hydrochloride, hydrobromide or hydroiodide. The preferred imino ester is an ethyl acetimidate hydrochloride corresponding to Formula II. The imino ester hydrohalide starting material can be prepared by known procedures, for example, by mixing a substituted acetonitrile such as 2-(4-amino-3-chlorophenoxy)acetonitrile with ethanol and excess hydrogen chloride in an inert organic solvent such as ether for 2 to 4 days at a temperature from about 0° to 25° C.

The reaction proceeds when the reactants are contacted and mixed in an inert organic solvent as a reaction medium. Representative inert organic solvents which can be employed as reaction media include methanol, ethanol and isopropanol. The reaction proceeds at temperatures of 25° to 100° C. and is preferably carried out at the boiling point of the reaction mixture under reflux. The exact proportion of the reactants to be employed is not critical; however, the imino ester hydrohalide and the 2-aminoalkylhydrazine are consumed in equimolar proportions and the reactants are preferably employed in such proportions. The reaction is generally complete in about 4 to 48 hours depending upon the reaction temperature employed. The product can be separated from the reaction mixture by acidifying the reaction mixture by the addition of aqueous acid such as hydrochloric acid or sulfuric acid followed by extraction to remove by-products such as substituted acetamides and alkyl substituted acetates. An aqueous base such as aqueous sodium hydroxide or aqeous sodium carbonate is then added to make the mixture strongly basic. The product can then be separated by extraction with a halogenated hydrocarbon solvent such as chloroform. The extraction solvent can be removed by evaporation and the product can be purified by recrystallization from organic solvents such as ethyl acetate, ether, pentane and the like.

In a convenient procedure for the preparation of the halophenoxymethyl-as-triazines corresponding to Formula I wherein A is acetamido, an ethyl 2-(substituted phenoxy)acetimide hydrochloride corresponding to Formula II is dissolved in ethanol and a 2-aminoalkylhydrazine corresponding to Formula III is mixed with the resulting solution. The mixture is then held at a temperature within the reaction temperature range for from 4 to 48 hours. The mixture is diluted with water and acidified to a pH of about 1 to 3 by the addition of an aqueous acid such as aqueous hydrochloric acid and washed with a chlorinated hydrocarbon solvent such as chloroform. The mixture is then made strongly basic by the addition of an aqueous base such as aqueous sodium carbonate or aqueous sodium hydroxide. The product is conveniently separated by extraction with a chlorinated hydrocarbon solvent. The product can be obtained from the extract by evaporation and can be purified by conventional procedures such as recrystallization or the product can be converted to a pharmaceutically-acceptable salt or to a halophenoxymethyl-as-triazine corresponding to Formula I when A is amino.

The compounds of the invention wherein A is amino are prepared by the hydrolysis of the compounds wherein A is acetamido. The hydrolysis is carried out in an inert organic solvent containing an excess of aqueous base, preferably an alkali metal hydroxide such as sodium hydroxide. Representative inert organic solvents which can be employed include methanol, ethanol and isopropanol. The reaction proceeds when a halophenoxymethyl-as-triazine corresponding to Formula I wherein A is acetamido is dissolved in an inert organic solvent and the solution is mixed with excess aqueous base, preferably sodium hydroxide. The reaction proceeds at temperatures from about 50° to about 100° C. and is preferably carried out at the boiling point of the mixture under reflux. The product can be separated by conventional procedures such as extraction with chlorinated hydrocarbon solvents. The product can be separated by evaporation of the extraction solvent and purified by conventional methods such as recrystallization, or it can be converted to a pharmaceutically-acceptable salt.

In a convenient procedure for preparing the compounds wherein A is amino, a halophenoxymethyl-as-triazine of the invention wherein A is acetamido is dissolved in ethanol and the resulting solution is then mixed with an excess of aqueous sodium hydroxide. The mixture is heated for about one to three hours at a temperature within the reaction temperature range. The product is separated by dilution with water and extraction. The product can be further purified by recrystallization or it can be converted to a pharmaceutically-acceptable salt. In a convenient procedure, the product is converted to the dihydrochloride salt and the salt is purified by recrystallization.

The pharmaceutically-acceptable salts of the halophenoxymethyl-as-triazine compounds can be prepared by dissolving the free base in ether and adding an excess of an acid such as hydrochloric acid, hydrobromic acid, malic acid, maleic acid or succinic acid until precipitation of the corresponding salt is complete. In the case of the compounds wherein A is amino, the mono-acid salt can be prepared by adding only one molar equivalent of acid. The di-acid salt can be similarly prepared by using at least two molar equivalents of acid for each molar equivalent of free base. The salt can further be purified by recrystallization or converted to the free base by hydrolysis.

The free base halophenoxymethyl-as-triazine can be prepared by hydrolysis of the salt in aqueous base. The salt is mixed with at least a molar equivalent of sodium hydroxide in aqueous solution, after which the free base can be separated by extraction with a chlorinated hydrocarbon solvent. The solvent can be removed by conventional methods such as evaporation or distillation and the halophenoxymethyl-as-triazine can be purified by methods such as recrystallization.

DESCRIPTION OF THE PREFERRED EMBODIMENTS

The following examples illustrate the invention but are not to be construed as limiting the same.

Example 1

Ethyl 2-(4-acetamido-3-chlorophenoxy)acetimidate hydrochloride (12 grams; 0.04 mole) was dissolved in 400 milliliters of ethanol and 2-aminoethylhydrazine (3 grams; 0.04 mole) was added to the resulting solution. The mixture was held at room temperature overnight and then evaporated in vacuo. The residue was mixed with 300 milliliters of an aqueous solution containing 20 milliliters of hydrochloric acid and 20 milliliters of sulfuric acid and washed with three separate portions of chloroform, the washings being discarded. The mixture was made basic by mixing with aqueous 10 normal sodium hydroxide solution and the basic mixture was extracted three times with chloroform. The chloroform extracts were combined, dried over anhydrous magnesium sulfate, filtered and evaporated in vacuo. The 3-[(4-acetamido-3-chlorophenoxy)methyl]-1,4,5,6-tetrahydro-as-triazine residue was recrystallized from a mixture of ethanol and benzene and was found to melt at 197°–199° C. with decomposition. The structure of the product was confirmed by infrared spectroscopy.

In substantially the same procedure, 3-[(4-acetamido-3,5 - dichlorophenoxy)methyl - 1,4,5,6 - tetrahydro-as-triazine, having a molecular weight of 316, is prepared by the reaction of ethyl 2-(4-acetamido-3,5-dichlorophenoxy)acetimidate hydrochloride and 2-aminoethylhydrazine.

In substantially the same procedure, 3-[(4-acetamido-3,5 - dibromophenoxy)methyl] - 1,4,5,6 - tetrahydro - as-triazine, having a molecular weight of 400, is prepared by the reaction of ethyl 2-(4-acetamido-3,5-dibromophenoxy)acetimidate hydrochloride and 2-aminoethylhydrazine.

Example 2

Ethyl 2-(4-acetamido-3-chlorophenoxy)acetimidate hydrochloride (12 grams; 0.04 mole) was dissolved in 400 milliliters of ethanol and 1-methyl-1-(2-aminoethyl)-hydrazine (3.56 grams; 0.04 mole) was added to the resulting solution. The mixture was allowed to stand at room temperature overnight and was then evaporated in vacuo. The residue was mixed with 300 milliliters of an aqueous solution containing 200 milliliters of concentrated hydrochloric and 20 milliliters of concentrated sulfuric acid. The acidic aqueous mixture was washed with three separate portions of chloroform, the washings being discarded. The washed mixture was then made basic by the addition of aqueous 10 normal sodium hydroxide solution and the basic mixture was extracted three times with chloroform. The chloroform extracts were combined, dried over anhydrous magnesium sulfate, filtered and evaporated in vacuo. The 3-[(4-acetamido-3-chlorophenoxy) - methyl] - 1 - methyl - 1,4,5,6 - tetrahydro - as-triazine residue was recrystallized from a mixture of methanol and ethyl acetate and was found to melt at 144°–145° C. The product was found by analysis to have carbon, hydrogen and nitrogen contents of 52.4, 5.9 and 18.9 percent, respectively, as compared with the theoretical contents of 52.6, 5.8 and 18.9 percent, respectively, calculated for the named structure.

In substantially the same procedure, the following halophenoxymethyl-as-triazines of the invention are prepared.

3 - [(4 - acetamido - 3 - bromophenoxy)methyl] - 1,4,5,6-tetrahydro-as-triazine, having a molecular weight of 327, is prepared by the reaction of ethyl 2-(4-acetamido-3-bromophenoxy)acetimidate hydrochloride and 2-aminoethylhydrazine.

3 - [(4 - acetamido - 3 - bromo - 5 - chlorophenoxy)methyl]-1-methyl-1,4,5,6-tetrahydro-as-triazine, having a molecular weight of 375, is prepared by the reaction of ethyl 2-(4-acetamido-3-bromo-5-chlorophenoxy)acetimidate hydrochloride and 1-methyl-1-(2-aminoethyl)hydrazine.

Example 3

3 - [(4 - acetamido - 3 - chlorophenoxy)methyl] - 1,4,5,6-tetrahydro-as-triazine (4 grams; 0.014 mole) was dissolved in 80 milliliters of ethanol and 100 milliliters of aqueous 2 normal sodium hydroxide solution were added to the resulting solution. The mixture was heated to the boiling point under reflux for three hours and was then held overnight at a temperature of about 0° C. The mixture was then concentrated by evaporation in vacuo to a volume of about 100 milliliters and the concentrated mixture was diluted threefold with water. The mixture was extracted with four portions of chloroform. The chloroform extracts were combined, dried over anhydrous magnesium sulfate, filtered and concentrated by evaporation in vacuo to a volume of about 10 milliliters. The concentrated solution of 3-[(4-amino-3-chlorophenoxy)methyl]-1,4,5,6-tetrahydro-as-triazine was mixed with 400 milliliters of diethyl ether and the resulting solution was mixed with an excess of gaseous hydrogen chloride. The mixture was filtered and the filter cake was washed with diethyl ether. The filter cake was dried in vacuo and recrystallized from ethanol. The 3-[(4-amino-3-chlorophenoxy)methyl]-1,4,5,6-tetrahydro-as-triazine dihydrochloride product was found to melt at 236°–237° C. with decomposition. The product was found by analysis to have carbon, hydrogen and nitrogen contents of 38.3, 4.8 and 17.9 percent, respectively, as compared with the theoretical contents of 38.5, 5.1 and 18.0 percent, respectively, calculated for the named structure.

In substantially the same procedure, the following compounds of the invention are prepared.

3 - [(4 - amino - 3,5 - dichlorophenoxy)methyl] - 1,4,5,6-tetrahydro-as-triazine dihydrobromide is prepared by the hydrolysis of 3-[(4-acetamido-3,5-dichlorophenoxy)methyl]-1,4,5,6-tetrahydro-as-triazine in the presence of excess aqueous sodium hydroxide followed by treatment of the free base product with an excess of hydrogen bromide.

3 - [(4 - acetamido - 3 - bromo - 5 - chlorophenoxy)methyl] - 1 - methyl - 1,4,5,6 - tetrahydro - as - triazine hydrochloride, having a molecular weight of 375, is prepared by the hydrolysis of 3-[(4-acetamido-3-bromo-5-chlorophenoxy)methyl] - 1 - methyl - 1,4,5,6 - tetrahydro-as-triazine in the presence of excess aqueous sodium hydroxide followed by treatment of one molar proportion of the free base product with one molar proportion of hydrogen chloride.

Example 4

3 - [(4 - acetamido - 3 - chlorophenoxy)methyl - 1-methyl-1,4,5,6-tetrahydro-as-triazine (2 grams; 0.007 mole) was dissolved in 25 milliliters of ethanol and 50 milliliters of aqueous 2 normal sodium hydroxide solution were added to the resulting solution. The mixture was heated to the boiling temperature under reflux for 1.5 hours and was then cooled to about 40° C. The mixture was evaporated in vacuo to a volume of about 30 milliliters and the concentrated solution was mixed with 25 milliliters of ethanol and 50 milliliters of aqueous 2 normal sodium hydroxide solution. The resulting mixture was heated to the boiling point under reflux for two hours and was then cooled to 40° C. and concentrated by evaporation in vacuo. The concentrated mixture was mixed with 500 milliliters of diethyl ether and an excess of hydrogen chloride was mixed with the ether mixture until precipitation was complete. The mixture was evaporated in vacuo. The residue was recrystallized from isopropanol and the 3-[(4-amino-3-chlorophenoxy)methyl]-1-methyl-1,4,5,6-tetrahydro-as-triazine dihydrochloride product was found to melt at 217°–218° C. with decomposition. The product was found by analysis to have carbon, hydrogen and nitrogen contents of 40.5, 5.3 and 17.2 percent, respectively, as compared with the theoretical contents of 40.3, 5.3 and 17.1 percent, respectively, calculated for the named structure. The structure of the product was confirmed by infrared spectroscopy.

In substantially the same procedure, 3-[(4-amino-3-bromophenoxy)methyl]-1,4,5,6-tetrahydro-as-triazine dihydrobromide, having a molecular weight of 461, is prepared by the hydrolysis of 3-[(4-acetamido-3-bromophenoxy)methyl]-1,4,5,6-tetrahydro-as-triazine in the presence of excess aqueous sodium hydroxide and the treatment of the free base product with excess hydrogen bromide.

The halophenoxymethyl-as-triazines of the invention have central nervous system activity as indicated by their antagonism of reserpine. In representative operation, several separate groups of ten mice each were administered one of the halophenoxymethyl-as-triazines of the invention by intraperitoneal injection. The test compounds were administered at a different dosage rate to each group of mice administered that particular compound. Thirty minutes after the administration of the test compounds, the mice were administered reserpine at a dosage rate of 5 milligrams per kilogram by intraperitoneal injection. The mice were then observed for 45 minutes for symptoms of reserpine-induced depression.

The administration of 5 milligrams per kilogram of reserpine intraperitoneally to mice results in a progression of symptoms beginning with drooping of the eyelids (ptosis) and pilo-erection, culminating in a generalized depression with decreased spontaneous motor activity and decreased responsiveness to auditory and tactile stimuli. Antagonism of reserpine-induced depression is indiciated by the absence of hte above symptoms and observation of normal spontaneous motor activity and normal responsiveness to auditory or tactile stimuli. The dosage of representative halophenoxymethyl-as-triazines of the invention effective to prevent reserpine-induced depression in 50 percent of the mice (ED 50) was calculated. 3-(4-acetamido - 3 - chlorophenoxy-methyl - 1,4,5,6 - tetrahydro-as-triazine, 3-(4-amino-3-chlorophenoxymethyl)-1,4,5,6-tetrahydro-as-triazine dihydrochloride and 3-(4-acetamido - 3 - chlorophenoxymethyl) - 1 - methyl - 1,4,5,6 - tetrahydro-as-triazine were found to have ED 50's of 18.5, 9.8 and 31.5 milligrams per kilogram, respectively.

What is claimed is:
1. A member of the group of compounds corresponding to the formula

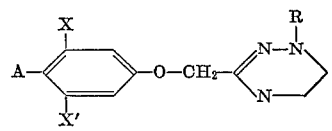

wherein A represents a member of the group consisting of acetamido and amino, R represents a member of the group consisting of methyl and hydrogen, X represents a member of the group consisting of chlorine and bromine and X' represents a member of the group consisting of hydrogen, chlorine and bromine, and the pharmaceutically-acceptable salts thereof.

2. The compound of claim 1 wherein the compound is 3 - [(4 - amino - 3 - chlorophenoxy)methyl] - 1,4,5,6-tetrahydro-as-triazine dihydrochloride.

3. The compound of claim 1 wherein the compound is 3 - [(4 - amino - 3 - chlorophenoxy)methyl] - 1,4,5,6-tetrahydro-as-triazine.

4. The compound of claim 1 wherein the compound is 3 - [(4-acetamido - 3 - chlorophenoxy)methyl] - 1,4,5,6-tetrahydro-as-triazine.

5. The compound of claim 1 wherein the compound is 3 - [(4 - amino - 3 - chlorophenoxy)methyl - 1 - methyl-1,4,5,6-tetrahydro-as-triazine dihydrochloride.

6. The compound of claim 1 wherein the compound is 3 - [(4 - amino - 3 - chlorophenoxy)methyl] - 1 - methyl-1,4,5,6-tetrahydro-as-triazine.

7. The compound of claim 1 wherein the compound is 3 - [(4 - acetamido - 3 - chlorophenoxy)methyl] - 1-methyl-1,4,5,6-tetrahydro-as-triazine.

OTHER REFERENCES

Trepanier et al., J. Medicinal Chem., vol. 9, pp. 881–5 (1966). Abstract available through Chemical Abstracts, vol. 61, cols. 10685–6 (1954).

HENRY R. JILES, Primary Examiner

JOHN M. FORD, Assistant Examiner

U.S. Cl. X.R.

260—453, 999